(12) United States Patent
Jira et al.

(10) Patent No.: US 7,387,291 B2
(45) Date of Patent: Jun. 17, 2008

(54) COLLAPSIBLE SHAFT AND CONTROL ASSEMBLY

(75) Inventors: Joseph J. Jira, Chandler, AZ (US); Robert D. Sleeper, Laveen, AZ (US); Mark W. Williams, Phoenix, AZ (US); Stuart K. Denike, Phoenix, AZ (US); Don J. Atkins, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 458 days.

(21) Appl. No.: 11/130,948

(22) Filed: May 16, 2005

(65) Prior Publication Data
US 2006/0255307 A1 Nov. 16, 2006

(51) Int. Cl.
*F16K 1/22* (2006.01)
(52) U.S. Cl. .................... 251/292; 251/308
(58) Field of Classification Search ............. 251/291, 251/292, 305, 308, 337
See application file for complete search history.

(56) References Cited

U.S. PATENT DOCUMENTS

| | | | |
|---|---|---|---|
| 2,257,979 A | | 10/1941 | Rubinstein |
| 2,879,027 A | * | 3/1959 | Mueller ............... 251/292 |
| 2,883,149 A | * | 4/1959 | Fiorentini ............ 251/306 |
| 3,841,145 A | * | 10/1974 | Boubel ................ 251/305 |
| 3,865,437 A | | 2/1975 | Crosby |
| 4,231,675 A | | 11/1980 | Scozzafava |
| 4,257,575 A | | 3/1981 | Runyan |
| 4,348,006 A | * | 9/1982 | Schmitt et al. ........ 251/308 |
| 4,541,612 A | * | 9/1985 | Yohner ................ 251/308 |
| 4,586,843 A | | 5/1986 | Heng et al. |
| 4,794,944 A | | 1/1989 | Henry |
| 4,890,946 A | | 1/1990 | von Pragenau |
| 5,020,932 A | | 6/1991 | Boyd |
| 5,704,590 A | * | 1/1998 | Pfeiffer .............. 251/309 |
| 6,126,356 A | | 10/2000 | Russell |

(Continued)

FOREIGN PATENT DOCUMENTS

DE 10157512 C1 7/2003

(Continued)

OTHER PUBLICATIONS

EP Search Report, 06114008.3, Feb. 14, 2007.

*Primary Examiner*—John Bastianelli
(74) *Attorney, Agent, or Firm*—Ingrassia Fisher & Lorenz

(57) ABSTRACT

The present invention provides a collapsible shaft and control assembly that is useful for transferring rotational control valve movements to a control surface. The invention includes a housing, shaft, and actuator arm. The housing defines a hollow cylinder. The shaft has a resilient end with a plurality of flexible strips capable of radial bending so as to transition between an expanded position and a compressed position. The shaft is positioned in the hollow cylinder, in the expanded position, so that the shaft can rotate. The actuator arm is positioned within the resilient end of the shaft so as to maintain the resilient end of the shaft in the expanded position. Both the actuator arm and shaft include reciprocal engagement means, and the actuator arm and shaft are positioned so as to engage the reciprocal engagement means. A rotational movement of the actuator arm thus causes a rotational movement of the shaft. A flapper affixed to the shaft can direct air depending on the radial position of the shaft.

18 Claims, 8 Drawing Sheets

U.S. PATENT DOCUMENTS

| | | |
|---|---|---|
| 6,203,237 B1 | 3/2001 | Swift et al. |
| 6,209,850 B1 * | 4/2001 | Rafalski .................... 251/308 |
| 6,322,282 B1 | 11/2001 | Kussman et al. |
| 6,453,796 B1 | 9/2002 | Rocquet |
| 6,612,325 B2 * | 9/2003 | Rentschler et al. ......... 251/308 |
| 6,676,109 B2 * | 1/2004 | Gomi et al. ................ 251/288 |

FOREIGN PATENT DOCUMENTS

| | | |
|---|---|---|
| EP | 1591702 A1 | 11/2005 |
| GB | 1207913 A | 10/1970 |

* cited by examiner

COLLAPSIBLE SHAFT AND CONTROL ASSEMBLY

FIELD OF THE INVENTION

The present invention relates to a collapsible shaft and related control assembly. More particularly the invention relates to methods and materials for assembling and using a diverter valve assembly in a conduit so as to provide air flow control.

BACKGROUND OF THE INVENTION

In a variety of mechanical situations, there arises a need to transfer rotational control movements from a control valve to a control surface. This may be accomplished by attaching a control valve to an actuator arm so that the actuator arm provides rotational movement directed by the control valve. The actuator arm is then connected to a shaft which is positioned in a cylindrical guide in a housing. The shaft is further attached to a control surface, such as a flapper, so that rotation of the actuator arm rotationally moves the shaft and thus swings the control surface. The control surface may be positioned in a conduit so that movement of the control surface diverts or directs a fluid flow.

The assembly of the above parts (control valve, actuator arm, shaft, housing with cylinder guide, and flapper) can be intricate and time consuming. It would be desired to find a simplified manner of assembling at least some of the parts so as to avoid delay. Further, the attachment of a flapper to a shaft may involve welding or riveting. These operations are somewhat cumbersome and difficult to perform if a shaft is already positioned in a housing. Thus, it would be desired to perform that attachment, flapper to shaft, in a separate step prior to other assembly steps. In this manner a shaft with a flapper already attached to it would then be assembled with the remainder of the components.

A specific application of the above generally described assembly is found in aircraft. Aircraft and other transportation vehicles often include climate control and environmental control systems. One aspect of such systems is the ability to divert or control air flow between two or more positions. In an airplane cockpit, for example, there is frequently found a lounge valve system which controls air flow. In the lounge valve system, a series of valves directs air between the pilot's position and the co-pilot's position.

In prior art systems that employ the lounge valve arrangement, air from some environmental control unit such as an air conditioner or heater is directed to a general location, such as the cockpit of an airplane, through a single duct. In the cockpit area the single duct then splits into two (or more) branches in order to direct air to specific locations. A typical arrangement involves a Y junction in which air from the source is then directed to the pilot's location and to the co-pilot's location by separate ducts. Within each separate duct there is positioned a flow valve. Typically this valve is an in-line valve such that the valve is inserted into the duct by cutting the duct, placing the valve at the cut location, and then clamping each of the two severed ends of the duct to the valve. Each of the two (or more) valves is thus independently operated so as to close air flow or allow air flow from a partial to a full amount.

It would be desired to control air flow in a lounge valve system through a single valve rather than, as practiced in some designs, through multiple valves. This would achieve an advantage in weight savings, cost savings, and installation time. Moreover, it would be desired to be able to quickly and easily assemble the valve.

Hence there is a need for a general method to assemble components in a control valve system quickly and easily. Further, there is a need for an air control system that provides air flow control at a relatively reduced weight, that provides a cost savings over known methods, and that can be relatively easily installed. The present invention addresses one or more of these needs.

SUMMARY OF THE INVENTION

The present invention provides a collapsible shaft and control assembly that is useful for transferring control valve movements to a control surface. In one embodiment, by way of example only, there is provided an assembly that includes a housing, a shaft, and an actuator arm. The housing defines a hollow cylinder. The shaft is rotatably disposed within the hollow cylinder of the housing, and the shaft is in an expanded position. The shaft further includes a resilient end with a plurality of flexible strips capable of radial bending so as to be able to place the resilient end in a compressed position. The resilient end of the shaft also has shaft engagement means. The actuator arm is disposed within the resilient end of the shaft so as to maintain the resilient end of shaft in the expanded position. The actuator arm further includes actuator arm engagement means. The actuator arm is further disposed such that the actuator arm engagement means reciprocally engage with the shaft engagement means so that a rotational movement of the actuator arm causes a rotational movement of the shaft.

In a further embodiment, still by way of example only, there is provided an assembly for transferring motion from a control valve to a control surface that includes a housing, a shaft, an actuator arm, and a flapper. The housing defines a hollow cylinder. The shaft is rotatably disposed within the hollow cylinder of the housing. The shaft comprises a plurality of flexible strips capable of radial bending so as to be able to place the shaft in a compressed position and an expanded position; and the shaft, when disposed in the hollow cylinder, is in the expanded position. The actuator arm is connected to the control valve, and the actuator arm is further connected to the shaft such that a rotational movement of the actuator arm causes a rotational movement of the shaft. The actuator arm is disposed so as to maintain the shaft in the expanded position. The flapper is attached to the shaft so that rotation of the shaft moves the flapper.

In still a further embodiment, and still by way of example only, there is provided a method for assembling an actuator arm with a shaft in a cylindrical housing, the shaft having a resilient end. The method includes the steps of: compressing the resilient end of the shaft into a compressed position, sliding the resilient end of the shaft into the cylindrical housing until the shaft transforms to an expanded position, and inserting the actuator arm into the shaft thereby maintaining the shaft in the expanded position.

Other independent features and advantages of the collapsible shaft and control assembly will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

There is now described a compressible shaft and control assembly that allows the transfer of rotational movement from an actuator arm to a shaft disposed in a cylinder. Rotation of the actuator arm may be directed by a control valve. The rotation of the shaft may further provide movement to an additional control surface or component, such as a flapper, attached to the shaft. The components may be quickly assembled by compressing a resilient end of the shaft from an expanded position to a compressed position, thereby allowing the shaft to slide through the cylinder, until the resilient end of the shaft passes through the cylinder and returns (snaps) to the expanded position. The actuator arm, disposed in the resilient end, then maintains the resilient end in the expanded position.

Figure 1:
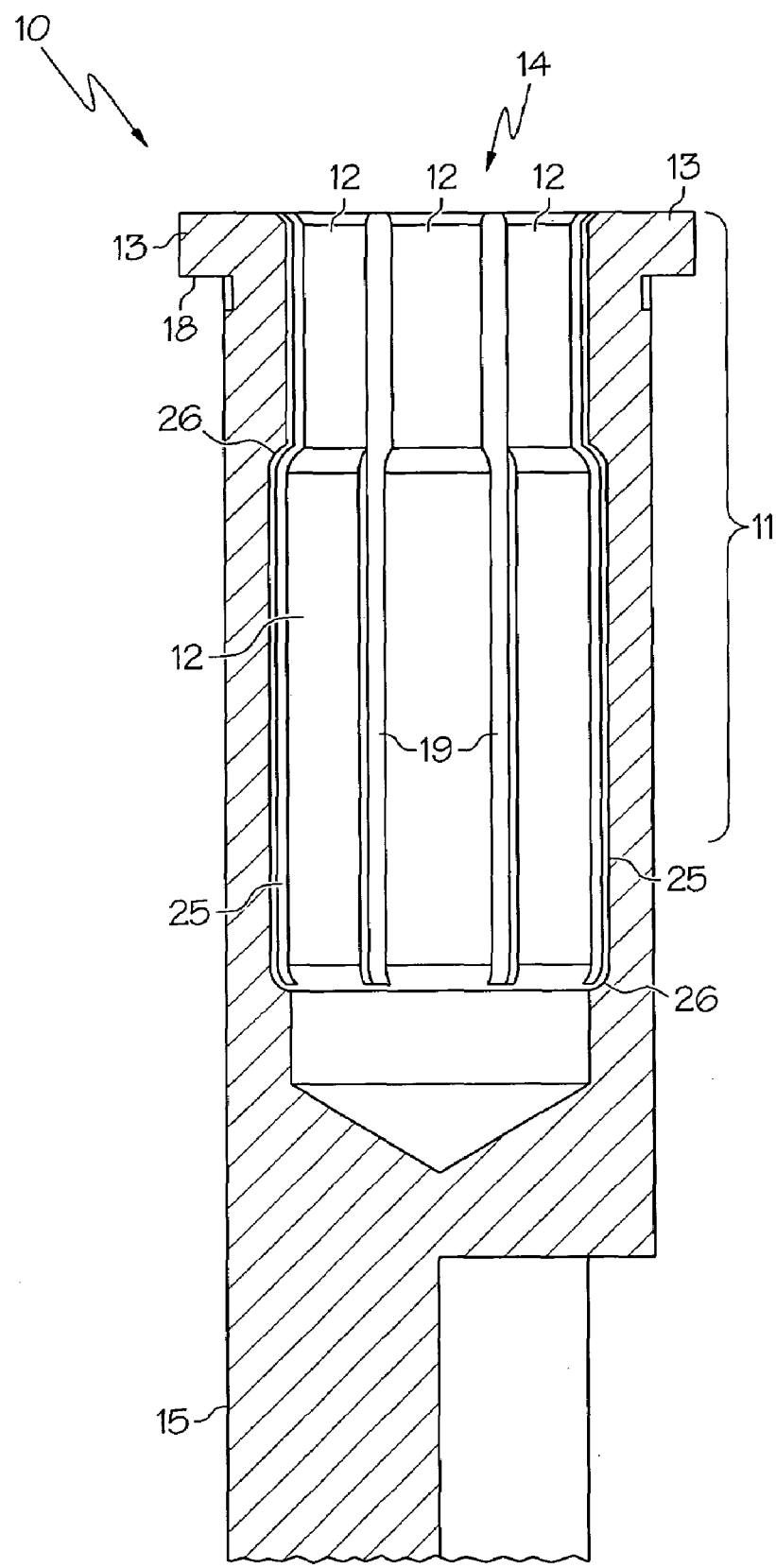
FIG. 1 is a cross sectional view of a portion of a shaft according to an embodiment of the present invention.

Referring now to FIG. 1 there is shown a cross sectional side view of an embodiment of shaft 10. In FIG. 1 shaft 10 is shown in an expanded position, which is the normal unstressed position of shaft 10. Shaft 10 includes a resilient end 11, which includes a plurality of strips 12. In an embodiment, strips 12 each further include a shoulder 13. Resilient end 11 of shaft 10 further defines a hollow receiving area 14. Lower portion 15 of shaft 10 (not fully shown) may have any number of configurations for the transfer of force or for the attachment of further structures. In a preferred embodiment, a control surface or flapper (not shown in FIG. 1) is attached to lower portion 15 of shaft 10.

Figure 2:
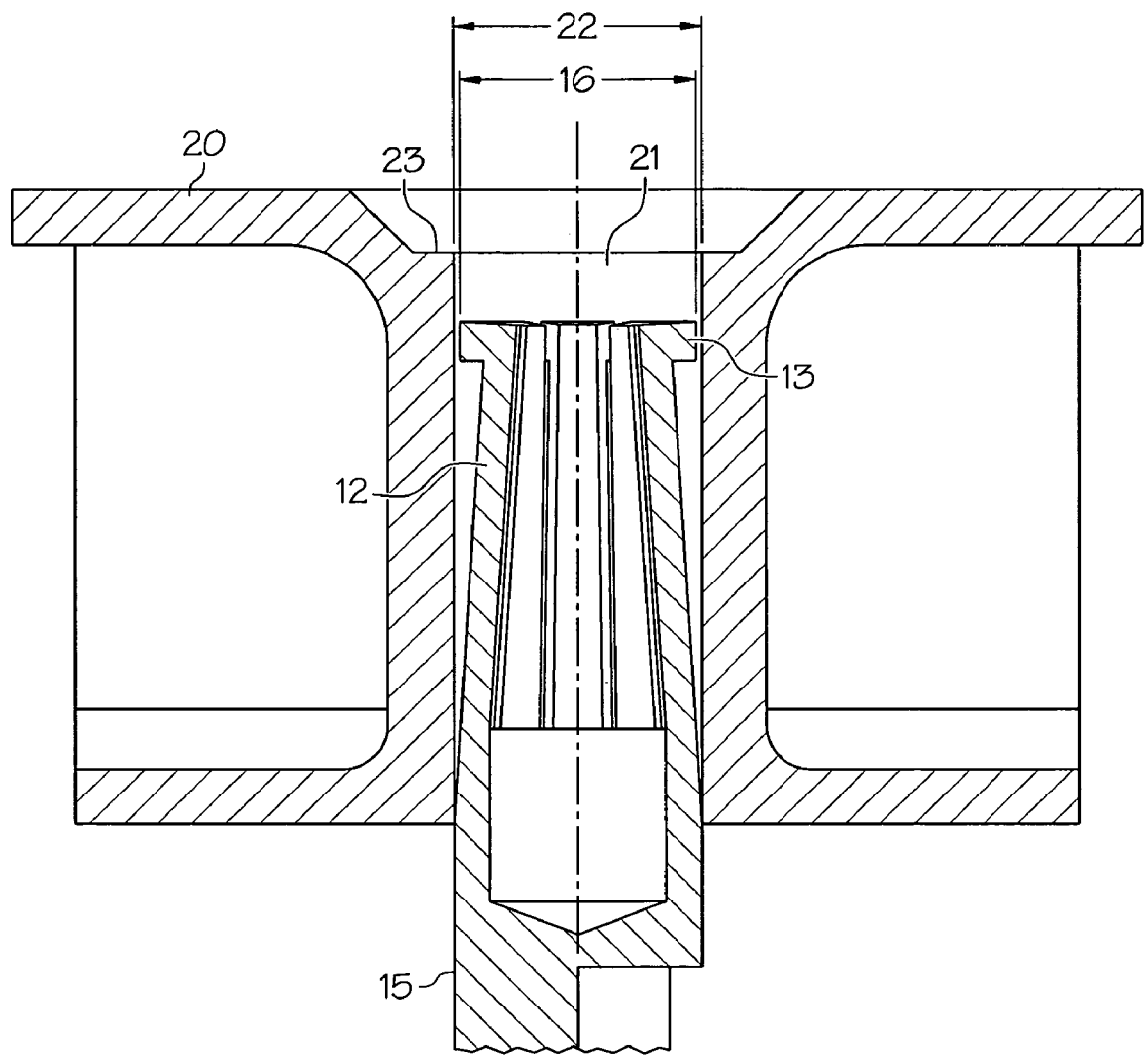
FIG. 2 is a cross sectional view of a portion of a shaft, in the compressed position, disposed within a hollow cylinder of a housing according to an embodiment of the present invention.
Figure 3:
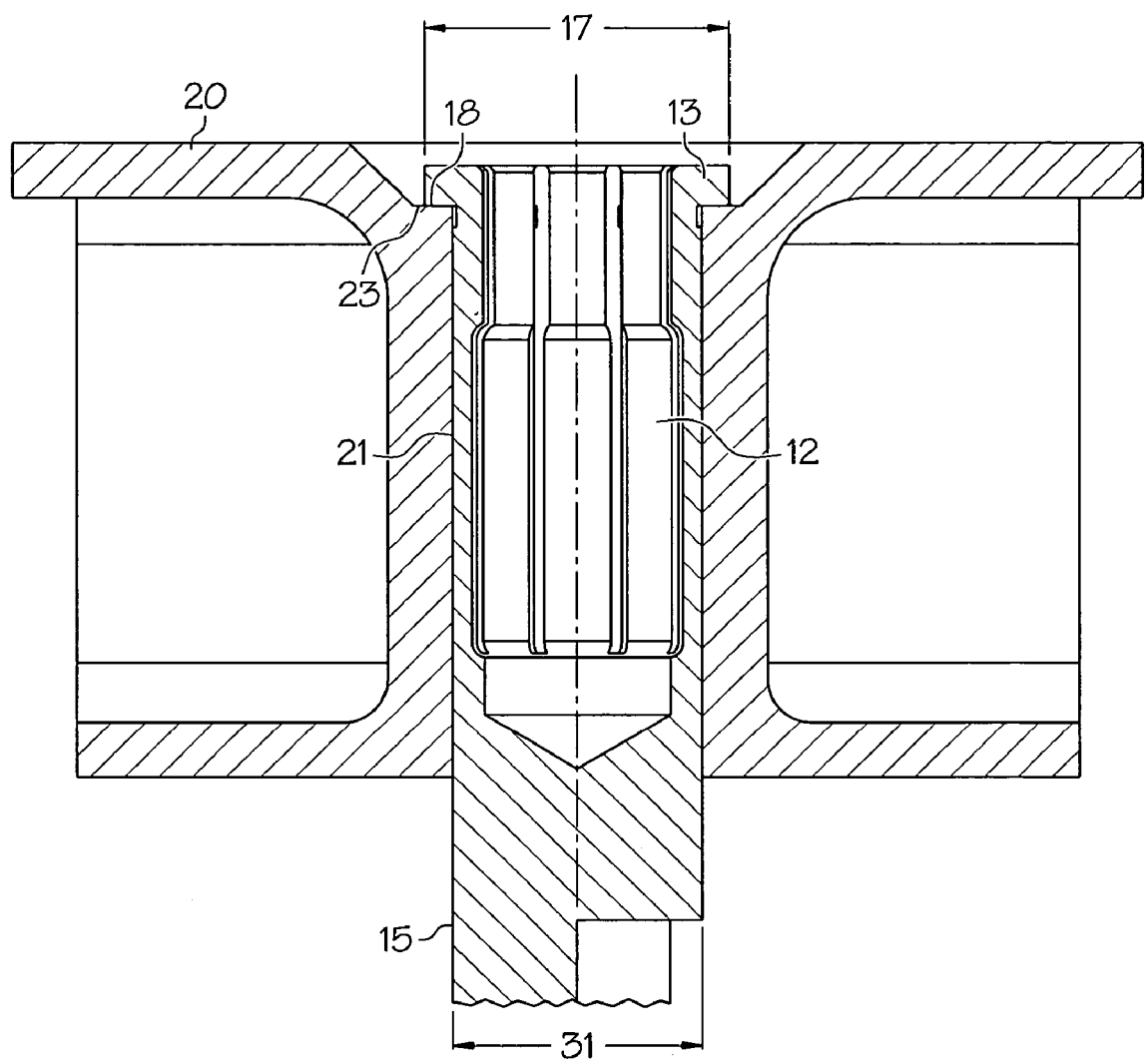
FIG. 3 is a cross sectional view of a portion of a shaft, in the expanded position, disposed in a hollow cylinder of a housing according to an embodiment of the present invention.

Referring now to FIG. 2 and FIG. 3 there is shown a positioning of shaft 10 in an exemplary housing 20 defining a hollow cylinder 21. FIG. 2 shows shaft 10 in a compressed position. The compressed position is achieved by compressing strips 12 radially inwardly an amount sufficient to allow resilient end 11 of shaft 10 to pass through cylinder 21. Thus, in the compressed position, shaft 10 can be described as defining a compressed position diameter 16. Further, cylinder 21 has a cylinder diameter 22. The compressed position diameter 16 is smaller than cylinder diameter 22. FIG. 2 also illustrates that embodiment of shaft 10 wherein strips 12 include shoulders 13. It is noted that in the compressed position, shoulders 13 pass through cylinder 21.

Referring now to FIG. 3 it is noted that shaft 10 is in the expanded position. Having passed through cylinder 21 to a point beyond the end of cylinder 21, where shoulders 13 can expand, strips 12 have resiliently returned to the expanded position. Preferably, strips 12 quickly snap to the expanded position when not constrained within cylinder 21, thus providing an indication of proper assembly. It is further noted that shoulders 13, in the expanded position, present an expanded shoulder diameter 17 that is greater than cylinder diameter 22. Thus, lip surface 18 of shoulder 13 is brought into contact with landing area 23 of housing 20. This contact between lip surface 18 and landing area 23 prevents shaft 10 from moving axially in one direction. In the expanded position of FIG. 3, shaft 10 is configured to fit within the space defined by the interior of cylinder 21, and preferably defines a generally cylindrical contour. Shaft 10 and cylinder 21 are sized so that shaft 10 is free to rotate within cylinder 21. Thus, in one embodiment, the expanded shaft diameter 31 is slightly less than cylinder diameter 22.

It will be appreciated that the method described for inserting shaft 10 into cylinder 21 is advantageous when certain other structures are attached to lower portion 15 of shaft 10. Certain bulky structures, such as a flapper, may be attached to lower portion 15. These bulky structures may have a size that does not permit them to pass through cylinder 21. Thus, when such a bulky structure is pre-attached to shaft 10, shaft 10 can only pass through cylinder 21 by inserting the resilient end 11 of shaft 10 in cylinder 21. It has been found that this procedure is advantageous, as opposed to first passing shaft 10 through cylinder 21 and then attaching any bulky structure to shaft 10. The advantage arises in that the preassembly of a bulky structure to shaft 10 eliminates any manufacturing issues from arising after the shaft 10 has been positioned. As mentioned, it is advantageous to pre-attach such a bulky structure to the shaft 10 because of the cumbersome nature of assembly operations such as riveting or welding. A supplier can, by pre-attaching, supply a shaft and flapper subassembly. The shaft 10 can then be installed in cylinder 21 as described herein.

Referring again to FIG. 1, certain details of shaft 10 are further noted. As stated, a resilient end 11 of shaft 10 includes a plurality of strips 12. The shape of resilient end 11 and strips 12 allows the movement from an expanded position to the compressed position and back again. However, no general rule can be established for the shape of strips 12. It will depend on variables such as (but not limited to) the cylinder diameter 22, cylinder height, the number of strips 12, and the material of construction. Certain guiding principles can, nevertheless, be described. A preferred shaping of resilient end 11 comprises a combination of strips 12 separated by strip spacings 19. The relative width of strips 12 and strip spacings 19 is selected so as to allow strips 12 to transitionally move from the expanded position to the compressed position. The length of strips 12 and strip spacings 19 affects the ease with which resilient end 11 transitions from the expanded position to the compressed position and back again. Long thin strips 12 move more easily than do wider and shorter strips 12. Radial thickness can further affect the stiffness and resiliency of strip 12.

Figure 4:
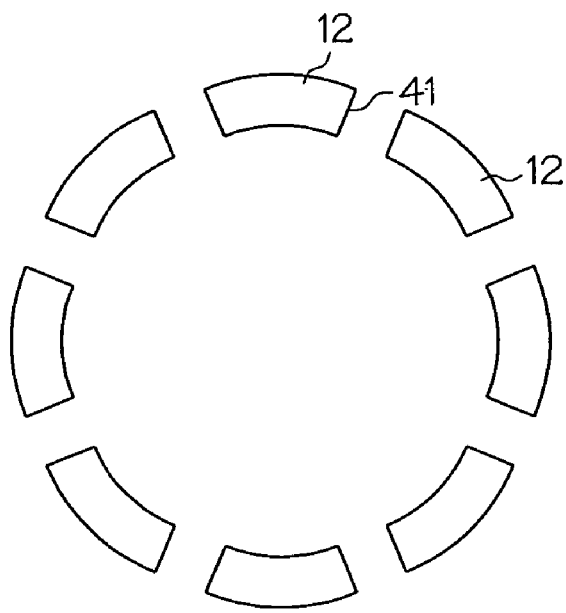
FIG. 4 is a cross sectional view of strips of a shaft in the expanded position according to an embodiment of the present invention.
Figure 5:
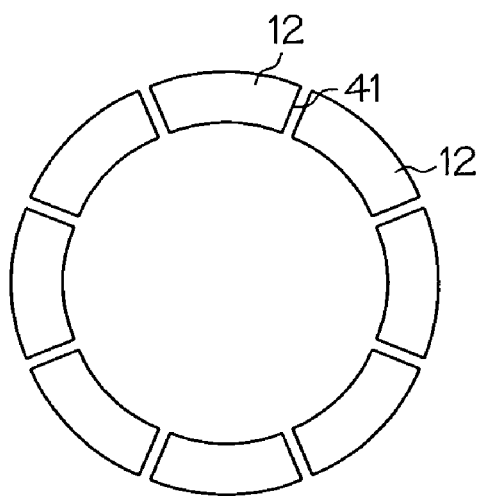
FIG. 5 is a cross sectional view of strips of a shaft in the compressed position according to an embodiment of the present invention.

The cross section of strips 12, illustrated in FIGS. 4 and 5, can also affect the movement of strips 12. FIGS. 4 and 5 show cross sections, in a plane normal to the central axis of shaft 10, in the area of shoulders 13. In FIG. 4 strips 12 are initially positioned in the expanded position. FIG. 4 shows plenty of clearance between neighboring strips 12. When strips 12 are moved radially and transition into the compressed position, FIG. 5, strips 12 move closer to one another. This movement brings strips 12 closer, in one aspect, in a circumferential relationship. Thus, it will be appreciated that allowance is made in a preferred embodiment so that the cross sectional shape of strips 12 allow for the desired range of movement. In one embodiment, this is achieved by chamfering side walls 41 of strips 12, as shown in FIGS. 4 and 5.

FIG. 1 also illustrates strips 12 as having curved areas 26 and straight areas 25. This shape is preferred in one embodiment as a way of allowing strips 12 to more easily bend. However, this shape is not necessary for the function of shaft 10. As explained further herein, a spring may be placed in shaft 10, and material removal from strips 12 may be needed to make a necessary space. Additionally, strips 12 and strip spacing 19 need not be straight or planar along certain surfaces as shown. Surfaces may be curved. For example, the outer contour of the resilient end 11 of shaft 10 is preferably curved so as to match the cylindrical contour of cylinder 21. Further, the cross sectional thickness of strips 12 may vary at different axial positions.

The stiffness and flexibility of the material comprising strips 12 may also affect a shape selection. Strips 12 and shaft 10 are preferably fabricated of a resilient material that allows radial bending of strips 12 so that shaft 10, upon application of a compressive force, can transition from an expanded position to a compressed position. However, the material is such that strips 12 resiliently return to the expanded position once the compressive force is removed. Preferred materials are identified below.

Figure 6:
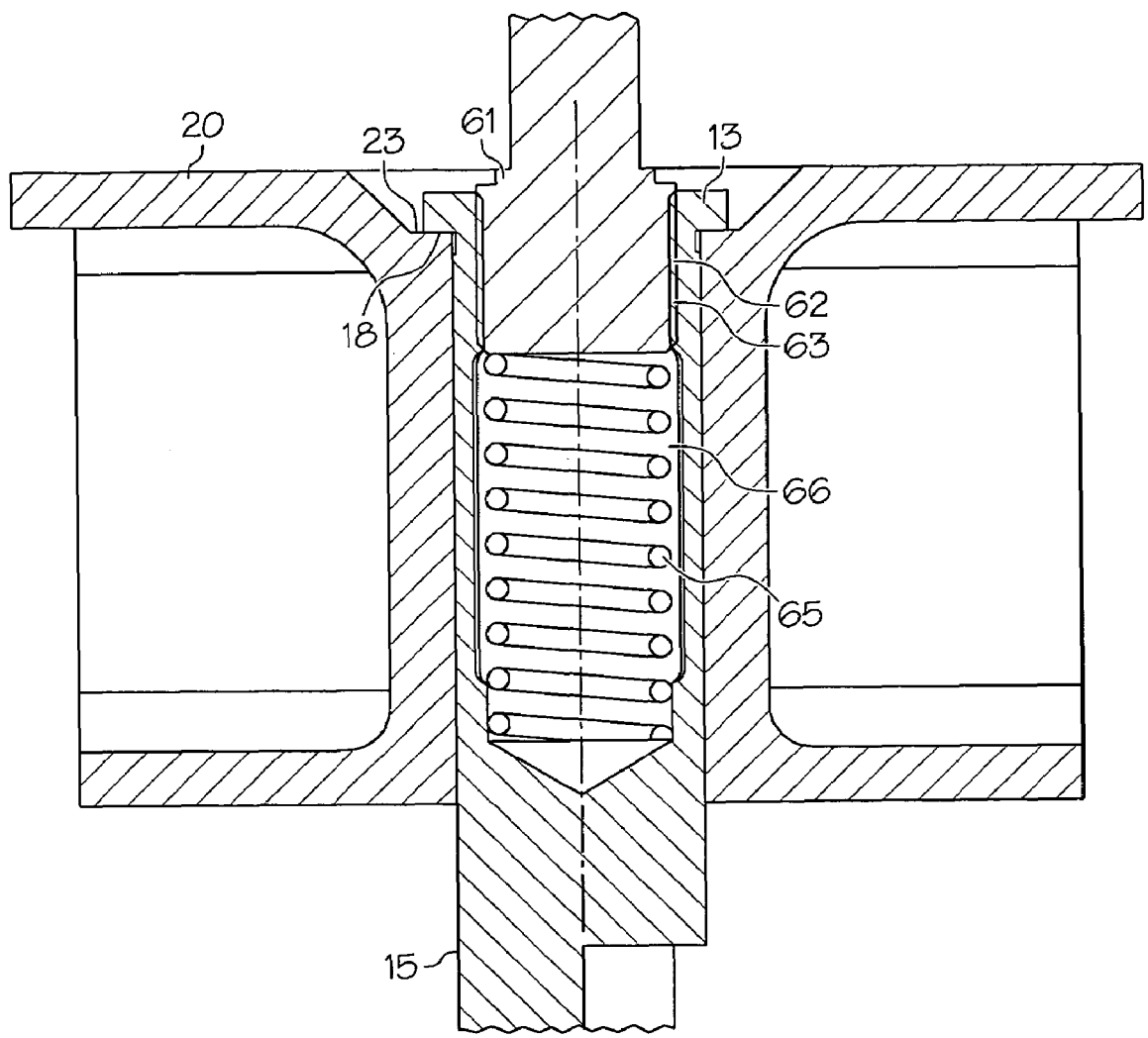
FIG. 6 is a cross sectional view of an actuator arm disposed in a shaft, which is disposed in a hollow cylinder of a housing, according to an embodiment of the present invention.

Referring now to FIG. 6 there is shown an actuator arm 61 disposed in receiving area 14 of shaft 10. The shape of actuator arm 61 matches the shape of receiving area 14 so that when actuator arm 61 is disposed in receiving area 14 actuator arm 61 acts to maintain shaft 10 in the expanded position. The presence of actuator arm 61 in receiving area 14 prevents resilient end 11 from appreciably moving radially inwardly. Further, the presence of actuator arm 61 within receiving area 14 prevents shoulders 13 from moving away from a position over landing area 23. However, actuator arm 61 does not so press against receiving area 14 so as to cause a degree of friction between shaft 10 and cylinder 21 that would prevent the free rotational movement of shaft 10. In a preferred embodiment, actuator arm 61 is cylindrical and defines an actuator arm diameter. When shaft 10 is in the expanded position, receiving area 14 may also be cylindrical and define receiving area inner diameter. In this preferred embodiment, actuator arm diameter is less than receiving area inner diameter.

Actuator arm 61 and shaft 10 are further disposed such that a rotational movement of actuator arm 61 imparts a rotational movement in shaft 10. In one embodiment actuator arm 61 is connected to shaft 10. In a preferred embodiment the form of connection comprises reciprocal engagement between actuator arm 61 and shaft 10. In this embodiment, shaft 13 includes shaft engagement means 62 that mates with a reciprocally fitting actuator arm engagement means 63. Preferably shaft engagement means 62 and actuator arm engagement means 63 comprise a structure such as matching splines, gears, or engaging teeth. Thus, for example, actuator arm 61 driven by a control valve (not shown) may have a toothed spline that fits within reciprocal splines of shaft 10. In this manner, a control valve, turning actuator arm 61, may impart a controlling motion on shaft 10. In an alternative embodiment, the actuator arm engagement means 63 may reciprocally fit within the strip spacings 19 and between strips 12. In this embodiment, strip spacings 19 also comprise a shaft engagement means 62.

FIG. 6 further illustrates an optional embodiment wherein spring 65 is disposed within spring area 66 of shaft 10. Spring area 66 comprises a further hollow area of shaft 10, which may be a continuation of receiving area 14. Spring 65 is disposed such that one end of spring 65 rests against a bottom portion of spring area 66, which may be a part of the body material of shaft 10. An opposite end of spring 65 is in contact with actuator arm 61 when actuator arm 61 is disposed in shaft 10. This position of spring 65 acts to maintain shaft 10 in a desired axial position relative to housing 20. Actuator arm 61 preferably places spring 65 in compression. Spring 65 thus exerts a force that tends to bias shoulder 13 against landing area 23 of housing 10. This positioning of shaft 10 is advantageous in that shaft 10 does not bounce axially, actuator arm engagement means 63 and shaft engagement means 62 are maintained in relative positions, and any control surface attached to shaft 10 is also maintained in a desired axial position.

Figure 7:
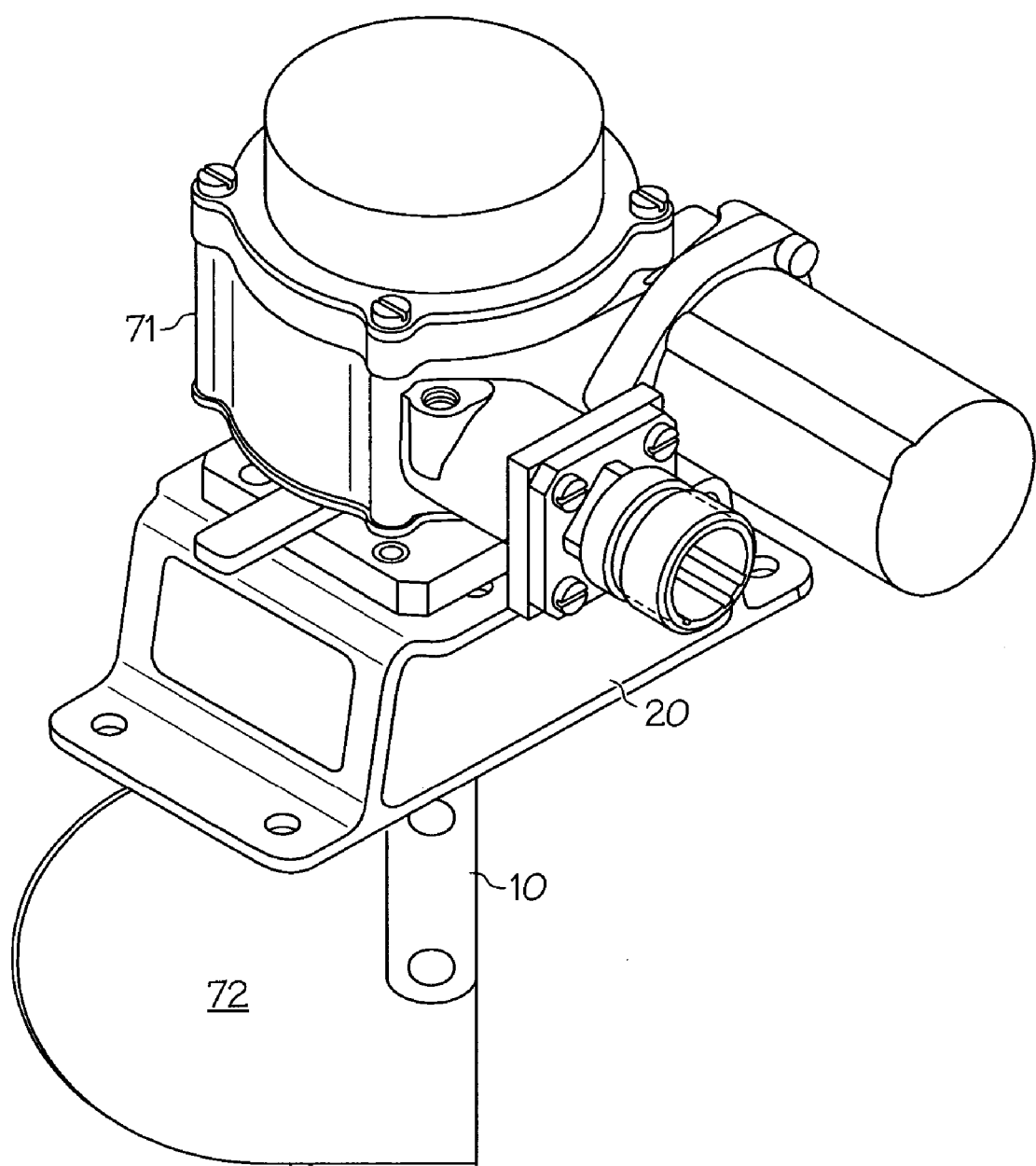
FIG. 7 is a perspective view of a control valve mounted to a housing and assembly, according to an embodiment of the present invention.

The description has, to this point, described aspects of a general apparatus for allowing the placement of a compressible shaft in a hollow cylinder and the coupling of an actuator arm to the shaft. A preferred embodiment of this apparatus is now described. In a specific application, the apparatus is designed to be used with another body such as a control valve which, by controlling the actuator arm, thereby controls movement of the shaft as well as any structure affixed to the shaft. Referring now to FIG. 7 there is shown a perspective view of such an assembly comprising an actuator/control valve assembly 71, housing 20, shaft 10, and flapper 72. In operation housing 10 may be positioned over a duct (not shown) such that flapper 72 is positioned within the duct. Thus the movement of flapper 72 directs and controls the flow of fluid, such as air, within the duct. Actuator/control valve assembly 71, through movement of actuator arm (not shown in FIG. 7) and shaft 10, controls flapper 72.

Figure 8:
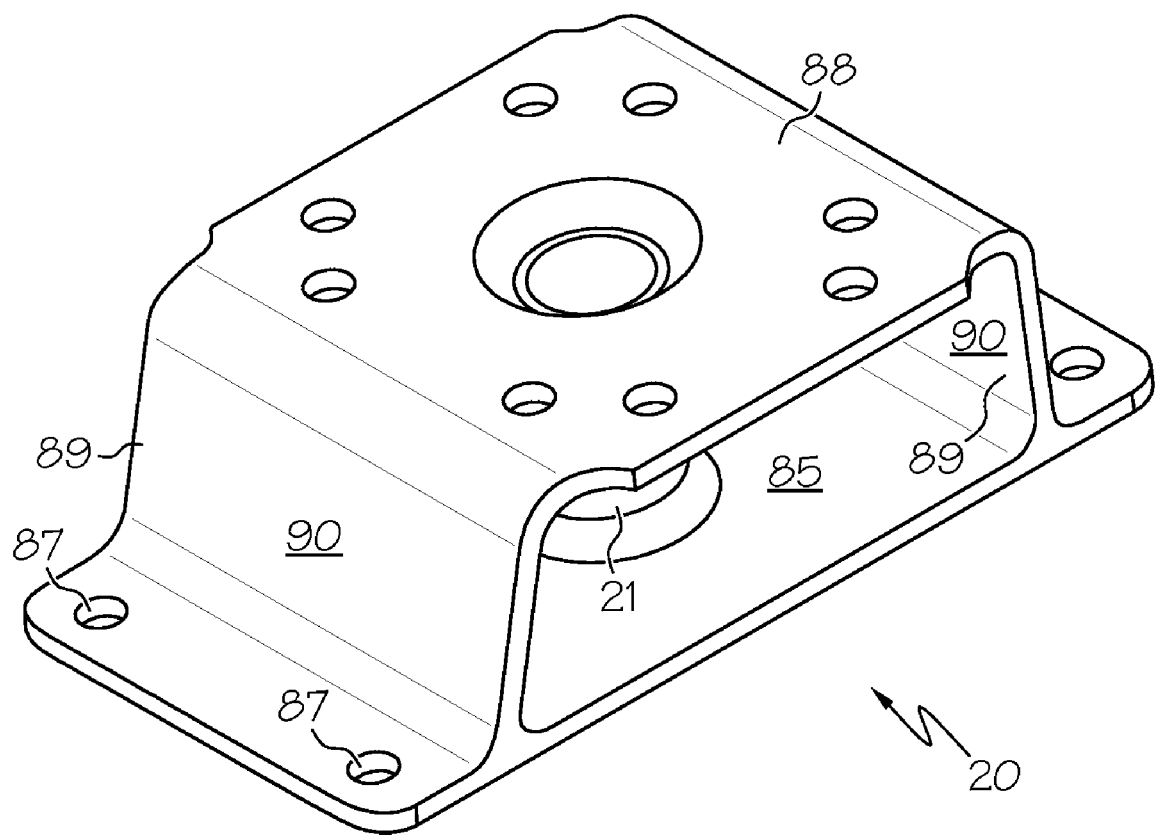
FIG. 8 is a perspective view of a housing according to an embodiment of the present invention.

Referring now to FIG. 8 there is shown an embodiment of housing 20 for use in the present invention. In a preferred embodiment housing 20 is a unitary molded piece with individual features. Alternatively housing 20 may be assembled from components. For example, housing 20 may be welded of individual aluminum pieces. Housing 20 includes plate 85. Plate 85 is a substantially planar surface. In one embodiment plate 85 is generally rectangular in shape although other shapes may be used. Bolt holes 87 may be drilled in plate 85. Plate 85 may be used to secure housing 20 such as to a duct or conduit.

Housing 20 also includes platform 88. Platform 88 is a surface onto which a further body such as an actuator assembly or control valve may be affixed. Thus the surface of platform 88 may be adapted to receive the corresponding mounting surface of the assembly or control valve. In a preferred embodiment, platform 88 is a substantially planar surface. Platform 88 may also have holes with which to affix a control valve 71 to platform 88. In one embodiment bolts connect a control valve 71 to platform 88. The bolts may be accessed through the open area that is defined between plate 85 and platform 88.

Figure 9:
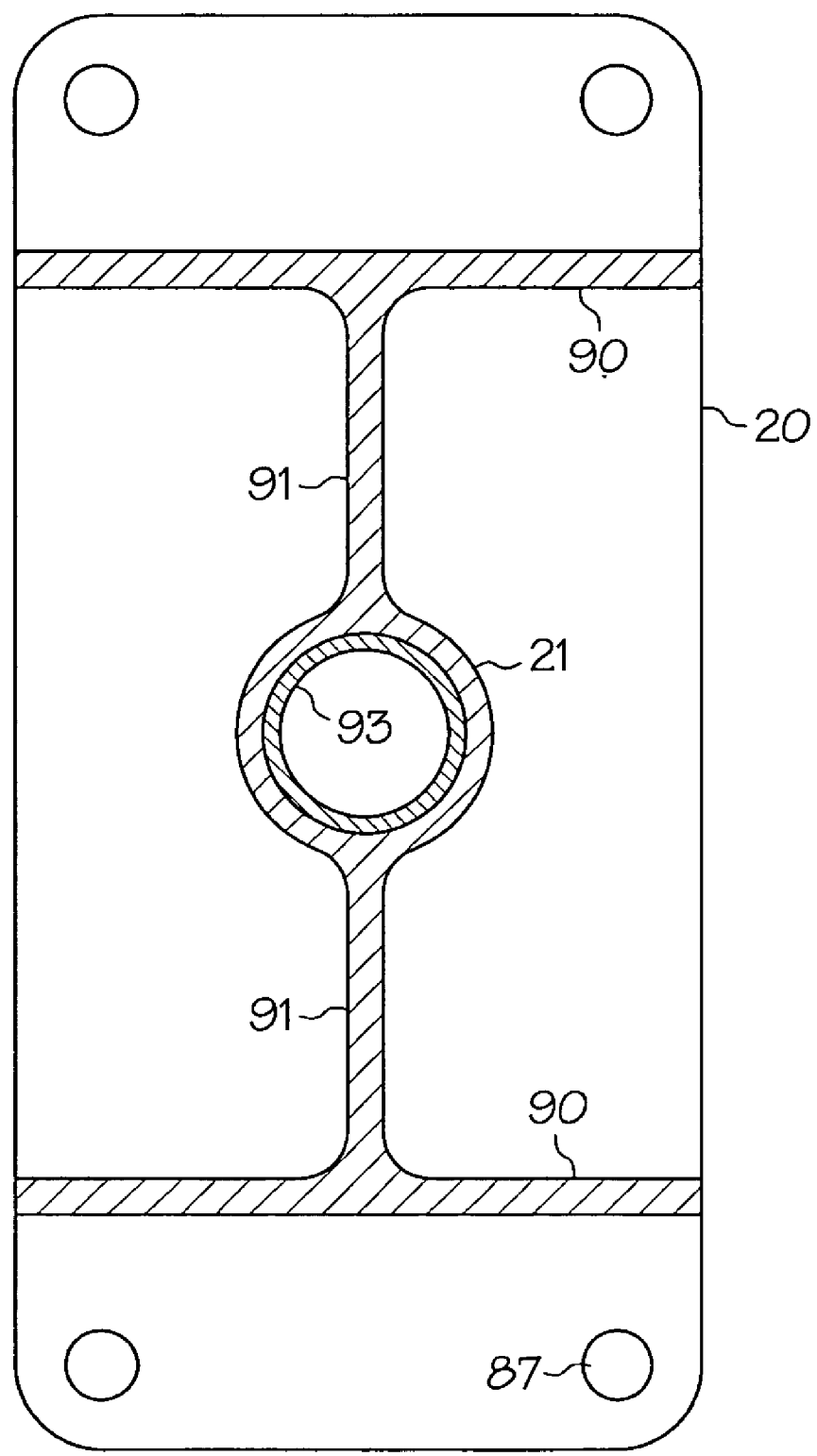
FIG. 9 is a cross sectional view of a housing according to an embodiment of the present invention.

Platform 88 is joined to plate 85 by supports 89. Supports 89 are preferably wall-like structures. Supports 89 provide a desired degree of separation between platform 88 and plate 85. The separation between platform 88 and plate 85 allows access to platform 88 and plate 85 in the area that lies between these two surfaces. This area is useful for accessing fasteners, such as bolts, that may be attached to housing 20 at platform 88 or plate 85. In a preferred embodiment, supports 89 include outer supports 90 and transverse supports 91. This is illustrated in FIG. 9 which shows a cross section of housing 20. Transverse supports 91 are set at a transverse position between outer supports 90 and cylinder 21. Transverse supports 91 provide stability and support to cylinder 21. In another embodiment transverse supports 91 are omitted from housing 20. When only outer supports 90 are used, when transverse supports 91 are not present, an optional weight savings can be achieved. Further weight saving can be achieved by cutting windows (removing material) from outer supports 90.

In the embodiment of FIG. 8 and FIG. 9, cylinder 21 is a structure disposed between platform 88 and plate 85. Cylinder 21 also provides a connection and support between platform 88 and plate 85. Cylinder 21 has a hollow interior so as to allow shaft 10 to pass therethrough and rotate therein. The exterior shape of cylinder 21 can take various shapes, a cylindrical shape is preferred for weight and material savings. Where cylinder 21 meets platform 88 and plate 85, there is defined a hole that allows access to the hollow interior of cylinder 21.

Optionally, as shown in FIG. 9, a bushing 93 may be disposed within cylinder 21. When bushing 93 is present, it is preferably press fit within cylinder 21. Also, when bushing 93 is used, cylinder 21 may include a stop (not shown) that acts to retain bushing 93 at a desired position within cylinder 21. Preferably bushing 93 is not used in order to achieve weight and material savings. Preferably shaft 10 and cylinder 21 are selected of materials that have an acceptably low degree of friction so that no further bushing or lubricant is necessary.

Referring again to FIG. 7 flapper 72 is affixed to shaft 10. Different means of attachment may be used including welding, riveting, and bolting flapper 72 to shaft 10. In a preferred embodiment, shaft 10 is machined to be flat at the area where flapper 72 is attached. Flapper 72 can then be riveted or spot welded to shaft 10. Preferably flapper 72 is fabricated from a lightweight rigid material such as aluminum or aluminum alloy sheet.

Flapper 72 is configured in profile so as to fit and move within a duct. As illustrated in FIG. 7, flapper 72 may take a curved or parabolic shape in order to fit within a curved or parabolic duct. Other shapes are possible. Flapper 72 may be rounded or circular in shape for example. A circular shaped flapper disposed within a circular duct may act as a butterfly valve, allowing air passage and restricting air passage depending on the position of flapper 72 within the duct. In a preferred embodiment the outer edge of flapper 72 is cut so that it does not make contact with the interior surface of the duct within which it is positioned.

The housing and components can be fabricated from any of a variety of known engineering materials. Plastic materials are one acceptable material. In airplane environments, aircraft aluminum and alloys thereof are also acceptable. A preferred material with which to fabricate the housing 20 and shaft 10 is polyetherimide (PEI) thermoplastic developed and sold under the trade name ULTEM®. ULTEM® was introduced by General Electric in the 1970's. It is an amorphous resin. It demonstrates high mechanical strength and rigidity, good chemical resistance, and inherently low flammability. ULTEM® resin is machinable and has a stable dielectric constant. It is a material known and used to fabricate various aircraft components. ULTEM® resin may be used as an unfilled resin; however, it is preferably used with a filler such as carbon or fiberglass. A preferred filling specification for the housing 20 is approximately 10% to approximately 30% carbon fiber reinforced.

In operation, the compressible shaft and control assembly of the present invention may be installed and put into service in a lounge valve system without the need of completely severing an existing duct. In a preferred embodiment a slit is cut into the duct. The geometry and dimension of the slit is sufficient to allow flapper 72 and shaft 10 to pass through the slit from the duct exterior into the interior area of the duct. Further the slit is of a sufficient size so as not to interfere with the operation of flapper 72 and shaft 10 when mounted. The housing 20 may then be positioned so as to receive resilient end 11 of shaft 10 in cylinder 21. As discussed above, shaft 10 passes through cylinder 21 until reaching the expanded position. Then housing 20 may be affixed to the duct. When housing 20 is affixed to the duct, a spring 65, actuator arm 61, actuator/control valve assembly 71, or other apparatus may be assembled with shaft 10 and housing 20. Control lines such as power lines and signal lines may then be attached to the actuator/control valve assembly 71.

Once installed in this manner, the actuator/control valve assembly 71 provides rotational commands to actuator arm 61. Actuator arm 61 passes rotational movement through shaft 10 to flapper 72. Flapper 72 is shaped so as to obstruct a portion of the area of the conduit in a fully expanded position. The area obstructed is preferably less than 100% of the cross-sectional area of the conduit. In a preferred embodiment, a flapper at most obstructs between about 60% to about 95% of the area of the conduit, and more preferably between about 60% and about 80% of the area of the conduit.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly comprising:
   a housing defining a hollow cylinder and a landing area;
   a shaft comprising a resilient section and a shoulder, the resilient section having a plurality of flexible strips radially bendable between an expanded position and a compressed position, the resilient section rotatably disposed within the hollow cylinder in the expanded position and configured to engage an actuator arm and to engage with the landing area of the housing such that the shaft resists axial movement; and an actuator arm disposed within, and engaging, the shaft resilient section whereby rotational movement of the actuator arm causes a rotational movement of the shaft, and preventing the plurality of flexible strips from moving to the compressed position.

2. The assembly according to claim 1 wherein the shaft defines a spring area, the assembly further comprising a spring disposed in the spring area.

3. The assembly according to claim 1 wherein the hollow cylinder defines a cylinder diameter, and wherein the resilient section of the shaft, when in the compressed position, defines a compressed position diameter that is smaller than the cylinder diameter, thereby allowing axial movement of the shaft within the hollow cylinder.

4. The assembly according to claim 1 wherein the shaft further comprises shaft engagement means and wherein the actuator arm further comprises actuator arm engagement means, and wherein the actuator arm is further disposed within the shaft resilient section such that the shaft engagement means reciprocally engage the actuator arm engagement means.

5. The assembly according to claim 4 wherein each of the actuator arm engagement means and the shaft engagement means comprises a structure selected from the group consisting of gears, teeth, and splines.

6. An assembly for transferring motion from a control valve to a control surface comprising:
a housing defining a hollow cylinder and a landing area;
a shaft rotatably disposed within the hollow cylinder of the housing, wherein the shaft has a resilient end comprising a plurality of flexible strips and a shoulder, the plurality of flexible strips capable of radial bending so as to place the shaft in a compressed position and an expanded position and wherein the resilient end of the shaft when disposed in the hollow cylinder is in the expanded position and engages with the landing area of the housing such that the shaft resists axial movement;
an actuator arm connected to the control valve, the actuator arm further connected to the shaft such that a rotational movement of the actuator arm causes a rotational movement of the shaft, the actuator arm further disposed so as to prevent the shaft from moving to the compressed position; and
a flapper attached to the shaft such that rotation of the shaft moves the flapper.

7. The assembly according to claim 6 wherein the housing further comprises a plate, a platform, and supports that separate the platform and the plate.

8. The assembly according to claim 7 wherein the housing comprises a unitary piece.

9. The assembly according to claim 6 wherein each of the housing and shaft comprises a material selected from the group consisting of aluminum, aluminum alloy, carbon impregnated composite, and carbon reinforced polyetherimide resin.

10. The assembly according to claim 6 wherein the flapper comprises a material selected from the group consisting of aluminum and aluminum alloy.

11. The assembly according to claim 6 further comprising a bushing disposed within the hollow cylinder.

12. The assembly according to claim 6 wherein the shaft defines a spring area, the assembly further comprising a spring disposed in the spring area.

13. The assembly according to claim 6 wherein the shaft further comprises shaft engagement means and wherein the actuator arm further comprises actuator arm engagement means, and wherein the actuator arm is further disposed within the shaft such that the shaft engagement means reciprocally engage the actuator arm engagement means.

14. The assembly according to claim 13 wherein each of the actuator arm engagement means and the shaft engagement means comprise a structure selected from the group consisting of splines, gears, and engaging teeth.

15. A method for assembling a rotatable actuator arm with a shaft in a cylindrical housing, the shaft having a resilient end having a plurality of flexible strips, the method comprising the steps of:
radially compressing the resilient end of the shaft into a compressed position;
sliding the resilient end of the shaft into the cylindrical housing until the shaft transforms to an expanded position;
positioning the resilient end of the shaft against a landing area on the cylindrical housing such that the shaft resists axial movement; and
inserting the actuator arm into the shaft thereby preventing the shaft from moving to the compressed position.

16. The method according to claim 15 wherein the step of compressing further comprises compressing the plurality of strips.

17. The method of claim 15 wherein the step of inserting further comprises engaging a shaft engagement means with a reciprocal actuator arm engagement means.

18. The method according to claim 15 wherein the shaft is connected to a flapper, and further comprising rotating the actuator arm so as to rotate the shaft, thereby moving the flapper.

* * * * *